Aug. 25, 1959 — W. W. TJOSSEM — 2,900,874
ROCKET LAUNCHER
Filed Sept. 18, 1948 — 2 Sheets-Sheet 1
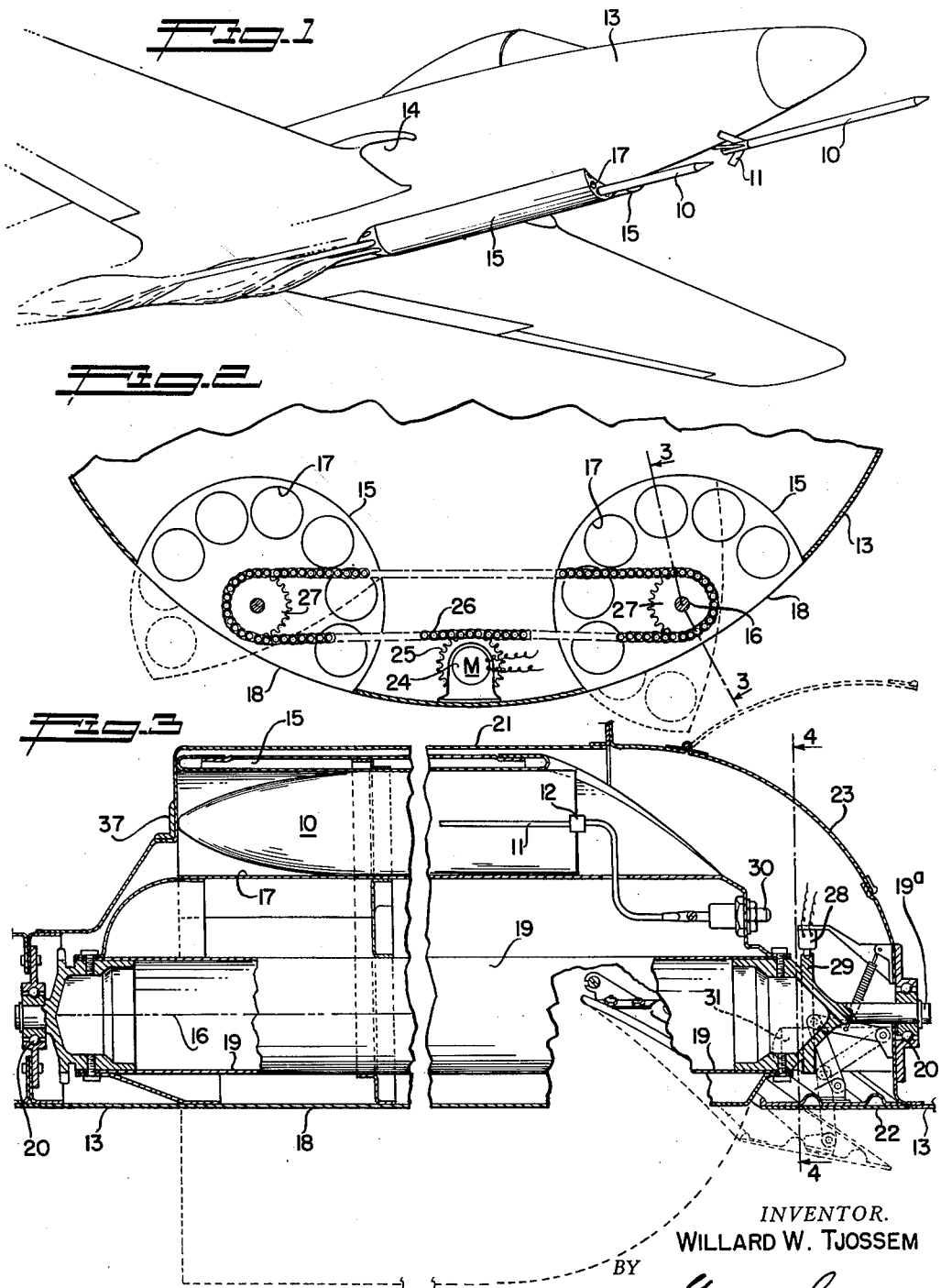
INVENTOR.
WILLARD W. TJOSSEM
BY
George C. Sullivan
Agent Aug. 25, 1959    W. W. TJOSSEM    2,900,874
ROCKET LAUNCHER
Filed Sept. 18, 1948    2 Sheets-Sheet 2
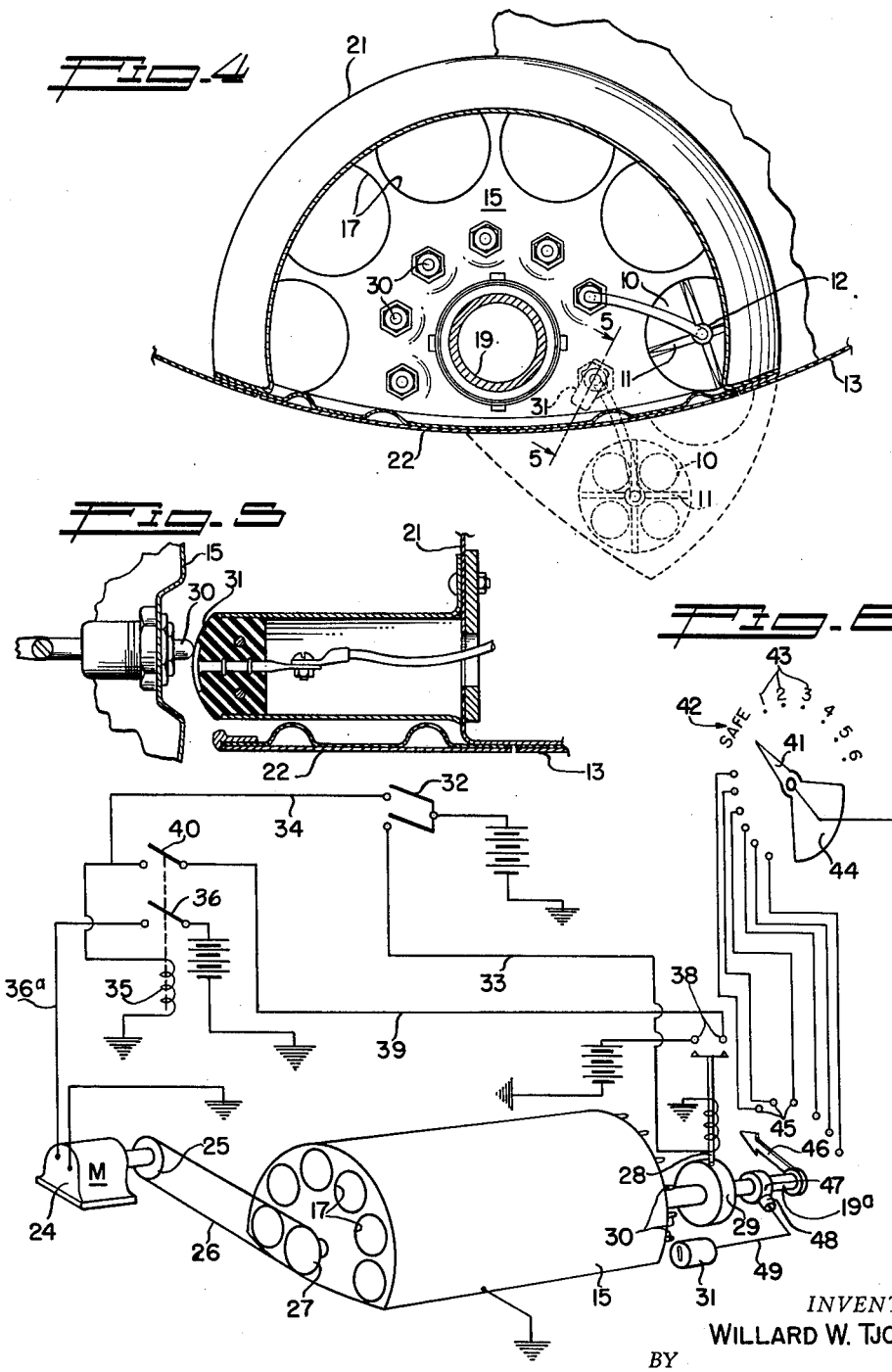
INVENTOR.
WILLARD W. TJOSSEM
BY
George C. Sullivan
Agent United States Patent Office 2,900,874
Patented Aug. 25, 1959

2,900,874

ROCKET LAUNCHER

Willard W. Tjossem, Burbank, Calif., assignor to Lockheed Aircraft Corporation, Burbank, Calif.

Application September 18, 1948, Serial No. 49,894

9 Claims. (Cl. 89—1.7)

This invention relates to an improved multiple rocket launcher which is housed within the outline of an airplane fuselage, or the like, and rotated to successively fire each of the rockets carried thereby.

Rockets have heretofore been carried suspended on racks beneath the airplane wing, causing high drag during flight prior to firing. Such arrangements are not only aerodynamically bad, but are awkward to load and wire, and the bulk of a multiple rocket installation restricts the application thereof in connection with fighter type aircraft. Such rockets per se have been developed to a high stage of performance, and it is now desirable to use them in air to air combat, as when a fighter or intercepter aircraft is attacking a bomber.

It is an object of this invention to provide a multiple rocket launcher which is normally flush with the skin or outline of an airplane fuselage or wing, except during the actual firing of the rockets. Such firing may be either substantially continuous and sequential, or selective and intermittent; as in the case of existing external rocket installations. To this end, I provide a drum-like turret revolving on an axis within and parallel to the airplane skin, and provide a flush surface along a portion of the turret to fair with the airplane skin in the idle or inactive position, a series of parallel rocket chambers being provided over the balance of the turret which chambers are moved outside the airplane skin, into firing position, by rotation of the turret. One or more such turrets may be carried by a given airplane according to the space available, and in multiple turret installations the turrets may be separately or simultaneously operated. In the event space and crew members are available for such work, as in large airplanes, a stock of rockets can be carried to recharge the turrets from inside the airplane after each firing cycle, thus greatly increasing the number of rockets that can be fired during a particular flight.

The advantageous features of this invention include aerodynamic cleanness in the retracted position, immediate availability for consecutive or intermittent firing of the rockets, compactness, and minimum trim change on the airplane during firing. Other and further objects and advantages will become apparent as the description proceeds, so that the embodiment of my invention, chosen for illustrative purposes, is not intended to limit my invention thereto.

In the drawings:

Figure 1 is a fragmentary, perspective drawing of an airplane showing rocket launchers embodying my invention, having rockets being fired therefrom;

Figure 2 is a cross section from the front of a pair of such rocket launchers, shown as having a common drive;

Figure 3 is an enlarged detail section on the line 3—3 of Figure 2 showing the mounting of one turret relative to the airplane skin;

Figure 4 is a section on the line 4—4 of Figure 3, showing in dotted lines the rotated position of the turret when the first rocket is in position to be fired;

Figure 5 is a fragmentary detail, taken on the line 5—5 of Figure 4, the firing circuit contactor which carries the firing circuit into the turret to the rocket in position to be fired; and Figure 6 is a schematic wiring diagram of the control circuits.

As shown on the drawings:

The illustrated embodiment of my invention is intended to fire a standard type of military rocket 10 having folding stabilizing fins 11, which fins are normally folded within the cylindrical profile of the rocket, but open out to form diagonal or swept back fins upon firing of the rocket. A rocket firing contact 12 is provided which is located at the rear intersection of the folded fins 11 and it is only necessary to complete an electrical circuit to this contact 12, from the airplane electrical system, to discharge the rocket. Since such an airplane circuit would be substantially similar to rocket, bomb, and machine gun firing circuits heretofore used, only a schematic description thereof will be given hereinafter.

The rocket launcher to be now described is intended to be mounted in any available place on an airplane, such as in the lower part of the fuselage 13, as shown in Figure 1. The main requirements are space therefor within the outline of the airplane structure, and forward clearance for the rockets when fired. Rearward clearance is not so essential, since the rocket flame impingent is of very short duration, and can be diverted if necessary. However, it is desirable to avoid having the rocket discharge enter the air intakes of the airplane, especially the intake of the powerplant, indicated at 14 in Figure 1.

A drum-like turret 15, of generally cylindrical form, is rotatably mounted on an axis 16 close to and parallel to the line of the fuselage 13. The diameter of the turret cylinder is large enough to project sufficiently outside the fuselage cross section to expose one or more of several rocket tubes 17 axially disposed in the turret. In its initial or retracted position, a portion or segment of the cylindrical cross section of the turret is cut away and replaced by a chord-like plate 18 fairing into the fuselage outline. Counter-clockwise rotation of the turret from its full line position in Figure 2 to its dotted line position therein exposes the first rocket tube 17 clear of the fuselage outline, in position to fire the rocket 10 therein. Intermittent or continued rotation sequentially places the succeeding rocket tubes in firing position. The only limit to the speed of rotation of the turret is that the first rocket to be ignited must clear its tube before the turret revolves sufficiently to again bring that tube close to the outline of the fuselage on the other side of the opening therefor. In the arrangement shown, approximately a quarter revolution of the turret is available for the launching cycle, so that three rockets could be in different stages of discharge during such a time interval, determined by the acceleration characteristics of the rocket itself.

The turret 15 and rocket tubes 17 are conveniently built up of sheet metal and tubes arranged on a tubular shaft 19 journaled in bearings 20 within a stationary housing 21 in the aircraft. The housing is desirably provided with an emergency vent passage at the rear, with a spring loaded vent door 22 to discharge gases in the event a rocket is inadvertently discharged within the confines of the housing. The thrust of such an inadvertently discharged rocket is resisted by a bracing ring 37 on the forward part of the housing, this thrust being insufficient to set off the fuse of the rocket war head.

In order to provide for reloading the rocket tubes from internally of the airplane, in the event space is available to carry an extra supply of rockets, an access door 23 may be provided in the housing 21 to permit recharging of empty rocket tubes.

While the turret could be rotated in any suitable manner, either continuously in one direction or reversed for retraction after firing, I have chosen to illustrate an electric drive comprising a motor 24 driving a sprocket 25, with a chain 26 trained over the sprocket 25 and sprockets 27 on two or more turret shafts 19. The motor 24 can be energized simultaneously with the firing circuit and with a solenoid released detent 28 engaging a notched cam 29 which normally centers the turret in its faired or retracted position.

The first rocket contact 12 is connected to a contact 30 carried by the turret, which contact 30 makes contact with a stationary contact 31 carried by the housing when the turret 15 has been rotated into the dotted line position of Figure 2 so that each rocket may be automatically fired as the turret moves into proper position.

A schematic wiring diagram is shown in Figure 6 which provides for either automatic sequence firing of the rockets, or selective firing at the will of the pilot. For rapid successive fire, the pilot's selector, to be later described, can be ignored for the moment. A double pole, single throw pilot's switch 32 has one pole closing a circuit 33 to the solenoid released detent 28, lifting the detent from the notch in the cam 29. The other pole of the pilot's switch 32 closes a second circuit 34 to a relay 35 which closes two switches. One switch 36 energizes a circuit 36a to drive the turret motor 24. In the simplest form of control this is all that is necessary if the stationary contact 31, for firing the rockets, is considered "live." In such case the pilot merely has to hold his switch 32 closed until the turret completes enough of a full rotation to fire all the rockets therein.

However, it is desirable to have the turret make a complete revolution and stop in the faired position it started from. To accomplish this, the solenoid released detent 28 is mechanically held in its upper position by riding on the cam 29, and carries contacts 38 closing a separate circuit 39 to a second switch 40 closed by the relay 35, this circuit also serving to hold the relay 35 closed after the pilot opens his switch 32. With this arrangement the turret will continue to rotate until the detent 28 drops into its notch in the cam 29, breaking the relay holding circuit 39 and opening the motor switch 36, so that the turret will complete its revolution to return to its faired position.

In order to provide for selective or intermittent firing of one or more of the rockets, a pilot's selector switch 41 is provided with a "safe" position 42 and separate contacts 43 for each of the rockets, adapted to be progressively picked up by a contact 44 on the switch, so that in the extreme right hand or number 6 position the switch energizes all six contacts 43. The six contacts 43 are separately connected to similar contacts 45 adjacent to and swept by a rotating contact 46 attached to and properly timed relative to the turret shaft 19a projecting beyond the housing 21, this contact 46 being electrically connected through a ring 47, brush 48 and wire 49 to the stationary firing contact 31 which successively contacts the individual rocket contacts in the turret. With this arrangement the pilot can fire one or more rockets, up to the total number, in one burst and any remaining rockets can be fired at some later time by resetting the selector switch 41 and re-energizing the pilot's switch 32.

The rocket launcher above described is primarily designed for rapid successive fire of a number of rockets. The actual speed of fire depends on the rocket characteristics, including ignition time delay and the initial acceleration rate determining the time required for a rocket to clear the turret while its tube is exposed beyond the airplane skin. With the arrangement shown, three rockets can be in various stages of firing during approximately a quarter revolution of the turret. With presently available rockets an overall firing time of approximately one-half second is possible for the six rockets in the turret; i.e. the turret may be driven at a rotative speed such that the rockets are progressively fired at one-tenth second intervals. The rocket itself is a standard military missile and possible future improvements therein may shorten the time required for each, and thus enable an increased rate of fire.

It will thus be seen that I have invented an improved rocket launcher capable of either rapid or intermittent firing, and it will, of course, be understood that various changes in details of construction and arrangement of parts may be made by those skilled in the art without departing from the spirit of the invention as set forth in the appended claims.

I claim as my invention:

1. A rocket launcher for use in airplanes, comprising a generally cylindrical turret having a plurality of rocket tubes therein parallel to the axis of said turret and a chord-like surface also generally parallel to the axis of said turret and replacing a portion of the cylindrical surface thereof to produce a flattened area along a portion of the otherwise cylindrical surface of the turret, means for mounting said turret relative to a surface of said airplane to rotate on its axis in substantial parallelism with the adjacent surface of the airplane, and to have the chord-like surface flush with the surface of the airplane in one position of the turret, and to position the rocket tubes in said turret to successively project beyond the airplane surface when the turret is rotated from said flush position, means for rotating said turret, and means for firing rockets positioned in said rocket tubes when said tubes project beyond the airplane surface.

2. A rocket launcher for use in airplanes, comprising a generally cylindrical turret having a plurality of rocket tubes therein parallel to the axis of said turret and a chord-like surface also generally parallel to the axis of said turret and replacing a portion of the cylindrical surface thereof to produce a flattened area thereon, means for mounting said turret relative to a surface of said airplane to rotate on its axis in substantial parallelism with the adjacent surface of the airplane, and wherein the chord-like surface is flush with the surface of the airplane in one position of the turret, and the rocket tubes in said turret successively project beyond the airplane surface when the turret is rotated from said flush position, means for rotating said turret, means for firing rockets positioned in said rocket tubes when said tubes project beyond the airplane surface, a housing within said airplane enclosing said turret and vent means from said housing to the exterior of the airplane.

3. A rocket launcher for use in airplanes, comprising a generally cylindrical turret having a plurality of rocket tubes therein parallel to the axis of said turret and a chord-like surface also generally parallel to the axis of said turret and replacing a portion of the cylindrical surface thereof to produce a flattened area thereon, means for mounting said turret relative to a surface of said airplane whereby the turret is adapted to rotate on its axis in substantial parallelism with the adjacent surface of the airplane, and wherein the chord-like surface is flush with the surface of the airplane in one position of the turret, and the rocket tubes in said turret successively project beyond the airplane surface when the turret is rotated from said flush position, means for rotating said turret, means for firing rockets positioned in said rocket tubes when said tubes project beyond the airplane surface, a housing within said airplane enclosing said turret and access means in said housing so constructed and arranged as to provide reloading of said rocket tubes from interiorly of the airplane.

4. A rocket launcher for use in airplanes, comprising a generally cylindrical turret having a plurality of rocket tubes therein parallel to the axis of said turret and a chord-like surface also generally parallel to the axis of said turret and replacing a portion of the cylindriacl surface thereof to produce a flattened area thereon, means for mounting said turret relative to a surface of said airplane whereby the turret is adapted to rotate on its axis in substantial parallelism with the adjacent surface of the airplane, and wherein the chord-like surface is flush with the surface of the airplane in one position of the turret, and the rocket tubes in said turret successively project beyond the airplane surface when the turret is rotated from said flush position, and means so constructed as to simultaneously rotate said turret and successively complete rocket firing circuits positioned in the rocket tubes thereof as each rocket tube is rotated into a position projecting beyond the airplane surface.

5. A rocket launcher arranged to successively and sequentially fire a plurality of rockets, comprising a generally cylindrical turret having a plurality of rocket tubes disposed parallel to the axis thereof, said turret having a chord-like surface replacing a portion of its generally cylindrical form, the axis of the turret being so disposed that said last mentioned surface fairs into the outline of a supporting structure on which the rocket launcher is to be installed, mounting means for supporting said turret for rotation about its cylindrical axis, means to rotate said turret about its axis, and means to successively fire rockets positioned in said rocket tubes as each rocket tube reaches a predetermined position during the rotation of said turret.

6. A rocket launcher of the type described adapted to normally be flush with and parallel to an external surface of a carrier therefor comprising a generally cylindrical turret having a series of rocket tubes disposed parallel to the cylindrical axis of the turret at equal radii relative thereto, mounting means so constructed and arranged as to support said turret for rotation with its axis parallel to the adjacent surface of the carrier therefor and with the rocket tubes exposed exterior of said carrier surface, said rocket tubes occupying only a portion of the circumference of said turret and the remainder of the cylindrical surface of said turret being replaced by a chord-like surface of greater radius than the cylindrical surface of said turret whereby to lie flush with the carrier surface when the turret is rotated to a predetermined position.

7. A rocket launcher of the type described adapted to normally be flush with and parallel to an external surface of a carrier therefor, comprising a generally cylindrical turret having a series of rocket tubes disposed parallel to the cylindrical axis of the turret at equal radii relative thereto, mounting means so constructed and arranged as to support said turret for rotation with its axis parallel to the adjacent surface of the carrier therefor and with the rocket tubes exposed exterior of said carrier surface, said rocket tubes occupying only a portion of the circumference of said turret and the remainder of the cylindrical surface of said turret being replaced by a chord-like surface of greater radius than the cylindrical surface of said turret whereby to lie flush with the carrier surface when the turret is rotated to a predetermined position, means so constructed and arranged as to rotate said turret, and means for successively firing rockets positioned in said rocket tubes as the latter are exposed exterior of said carrier surface.

8. A rocket launcher of the type described adapted to normally be flush with and parallel to an external surface of a carrier therefor, comprising a generally cylindrical turret having a series of rocket tubes disposed parallel to the cylindrical axis of the turret at equal radii relative thereto, mounting means so constructed and arranged as to support said turret for rotation with its axis parallel to the adjacent surface of the carrier therefor and with the rocket tubes exposed exterior of said carrier surface, said rocket tubes occupying only a portion of the circumference of said turret and the remainder of the cylindrical surface of said turret being replaced by a chord-like surface of greater radius than the cylindrical surface of said turret whereby to lie flush with the carrier surface when the turret is rotated to a predetermined position, means so constructed and arranged as to rotate said turret through one or more complete revolutions, and means associated with said last mentioned means to stop the turret rotation at its faired position.

9. A rocket launcher of the type described adapted to normally be flush with and parallel to an external surface of a carrier therefor, comprising a generally cylindrical turret having a series of rocket tubes disposed parallel to the cylindrical axis of the turret at equal radii relative thereto, mounting means to support said turret for rotation with its axis parallel to the adjacent surface of the carrier therefor and with the rocket tubes exposed exterior of said carrier surface, said rocket tubes occupying only a portion of the circumference of said turret and the remainder of the cylindrical surface of said turret being replaced by a chord-like surface of greater radius than the cylindrical surface of said turret and so shaped as to lie flush with the carrier surface when the turret is rotated to a predetermined position, and means constructed and arranged to rotate said turret through a complete revolution upon momentary energization thereof.

References Cited in the file of this patent

UNITED STATES PATENTS

| | | |
|---|---|---|
| 1,373,381 | Cooke | Mar. 29, 1921 |
| 1,424,751 | Barrgerter | Aug. 8, 1922 |
| 1,666,646 | Gomme | Apr. 17, 1928 |
| 1,876,158 | Winter | Sept. 6, 1932 |
| 2,029,692 | Zindel | Feb. 4, 1936 |
| 2,105,055 | Sanders | Jan. 11, 1938 |
| 2,261,121 | Martin | Nov. 4, 1941 |
| 2,293,043 | Coffman | Aug. 18, 1942 |
| 2,377,073 | Eaton | May 29, 1945 |
| 2,409,210 | Jolly | Oct. 15, 1946 |
| 2,421,893 | Lambert et al. | June 10, 1947 |
| 2,440,634 | Henney | Apr. 27, 1948 |
| 2,440,723 | Macdonald | May 4, 1948 |
| 2,445,423 | Eastman | July 20, 1948 |
| 2,451,745 | Jolly | Oct. 19, 1948 |
| 2,511,183 | Van Norman | June 13, 1950 |
| 2,520,736 | Reek | Aug. 29, 1950 |
| 2,566,390 | Weber | Sept. 4, 1951 |

FOREIGN PATENTS

| | | |
|---|---|---|
| 15,871 | Great Britain | 1913 |
| 589,177 | Great Britain | June 13, 1947 |
| 924,013 | France | July 24, 1947 |